United States Patent
Tojo et al.

(10) Patent No.: US 11,307,109 B2
(45) Date of Patent: Apr. 19, 2022

(54) DIFFERENTIAL PRESSURE GAUGE WITH IMPROVED SIGNAL-TO-NOISE RATIO SUPPRESSION

(71) Applicant: Azbil Corporation, Tokyo (JP)

(72) Inventors: Hirofumi Tojo, Tokyo (JP); Tomohisa Tokuda, Tokyo (JP); Nozomi Kida, Tokyo (JP)

(73) Assignee: AZBIL CORPORATION, Tokyo (JP)

(*) Notice: Subject to any disclaimer, the term of this patent is extended or adjusted under 35 U.S.C. 154(b) by 0 days.

(21) Appl. No.: 17/112,073

(22) Filed: Dec. 4, 2020

(65) Prior Publication Data

US 2021/0181052 A1   Jun. 17, 2021

(30) Foreign Application Priority Data

Dec. 12, 2019  (JP) .............................. JP2019-224263

(51) Int. Cl.
*G01L 13/02* (2006.01)
*G01L 19/00* (2006.01)
*G01L 9/00* (2006.01)

(52) U.S. Cl.
CPC ........ *G01L 13/025* (2013.01); *G01L 19/0038* (2013.01); *G01L 9/008* (2013.01)

(58) Field of Classification Search
None
See application file for complete search history.

(56) References Cited

U.S. PATENT DOCUMENTS

| | | | |
|---|---|---|---|
| 2015/0047435 A1* | 2/2015 | Ostrick | B81B 3/0021 73/716 |
| 2018/0275001 A1* | 9/2018 | Tokuda | G01L 1/2287 |

FOREIGN PATENT DOCUMENTS

JP            6130405 B2      5/2017

* cited by examiner

*Primary Examiner* — Lisa M Caputo
*Assistant Examiner* — Nigel H Plumb

(57) ABSTRACT

A differential pressure gauge of the invention contains: a diaphragm layer disposed between first and second parts; and a wall between a first region on a pressure-receiving portion side and a second region on a first through-hole side within a second pressure chamber. The diaphragm layer covers the pressure-receiving portion over a first pressure chamber and has the first through-hole with one end disposed in the second pressure chamber away from the pressure-receiving portion. The wall is disposed with gaps formed from inner walls of the second pressure chamber. The first pressure chamber is formed through the first part, the second pressure chamber has an opening facing the diaphragm layer, the first part has a second through-hole continuing to the first through-hole, and a base has a third through-hole with one end disposed in the first pressure chamber and a fourth through-hole continuing to the second through-hole.

5 Claims, 1 Drawing Sheet

DIFFERENTIAL PRESSURE GAUGE WITH IMPROVED SIGNAL-TO-NOISE RATIO SUPPRESSION

CROSS-REFERENCE TO RELATED APPLICATION

The present application claims the benefit of and priority to Japanese Patent Application No. 2019-224263, filed on Dec. 12, 2019, the entire contents of which are incorporated by reference herein.

TECHNICAL FIELD

The present invention relates to a differential pressure gauge.

BACKGROUND

A differential pressure gauge includes a first sub-chamber and a second sub-chamber on each of one face and the other face of a diaphragm (membrane) on which a piezoresistive element is formed, and measures a difference in pressure received from two directions, that is, from the first sub-chamber and the second sub-chamber (see Patent Literature 1). The first sub-chamber, the second sub-chamber, and a conduit connecting to each of the sub-chambers are filled with a pressure transmitting material, such as oil, and the pressure acts on the diaphragm through the pressure transmitting material.

CITATION LIST

Patent Literature

[PTL 1] Japanese Patent No. 6130405

SUMMARY

However, the conventional differential pressure gauge described above has a problem in that adverse effects of static pressure is not considered, and thus the S/N ratio is lowered. In the conventional differential pressure gauge, the first sub-chamber area is different from the area of the second sub-chamber in the direction parallel to the face of the diaphragm. In this case, because of a large difference between the area acted upon by the pressure introduced into the first sub-chamber and the area acted upon by the pressure introduced into the second sub-chamber, the diaphragm deforms when the static pressure is large. Thus, even in a state where there should be no differential pressure, the diaphragm deforms, which causes noise and decreases the S/N ratio.

To solve the problem described above, it is an object of the present invention to suppress a decrease in the S/N ratio in a differential pressure gauge.

A differential pressure gauge according to the present invention comprises: a base; a first part disposed on an upper surface of the base and defining a first pressure chamber; a second part disposed on the first part, comprising a region in which the first pressure chamber is defined in plan view, and defining a second pressure chamber, the second pressure chamber being larger than the first pressure chamber; a diaphragm layer disposed between the first part and the second part, comprising a pressure-receiving portion in the region of the first pressure chamber in plan view, the diaphragm layer being formed with a first through-hole, the first through-hole having an opening at one end disposed in the second pressure chamber in a region other than the pressure-receiving portion; and a wall disposed in the second pressure chamber between a first region on a side comprising the pressure-receiving portion and a second region on a side comprising the first through-hole, the wall being disposed with gaps formed with respect to inner walls of the second pressure chamber. The first pressure chamber is formed through the first part, the second pressure chamber has an opening on the diaphragm layer side, the first part is formed with a second through hole continuing to the first through-hole, the base is formed with a third through-hole having an opening at one end in the first pressure chamber and a fourth through-hole continuing to the second through-hole.

In one configuration example of the differential pressure gauge described above, the wall is formed to be connected to the diaphragm layer and a ceiling of the second pressure chamber facing the diaphragm layer.

In one configuration example of the differential pressure gauge described above, the wall defines the gap between the diaphragm layer and the ceiling of the second pressure chamber facing the diaphragm layer.

In one configuration example of the differential pressure gauge described above, the wall is formed to be connected to each of two side surfaces of the second pressure chamber facing each other across the wall.

In one configuration example of the differential pressure gauge described above, the diaphragm layer is provided with a strain gauge provided in the pressure-receiving portion of the diaphragm.

As explained above, according to the present invention, since the wall is disposed between the first region of the second pressure chamber on the side comprising the pressure-receiving portion and the second region on the side comprising the first through-hole with a gap with respect to inner walls of the second pressure chamber, so that a decrease in an S/N ratio in the differential pressure gauge can be suppressed.

DETAILED DESCRIPTION

Figure 1:
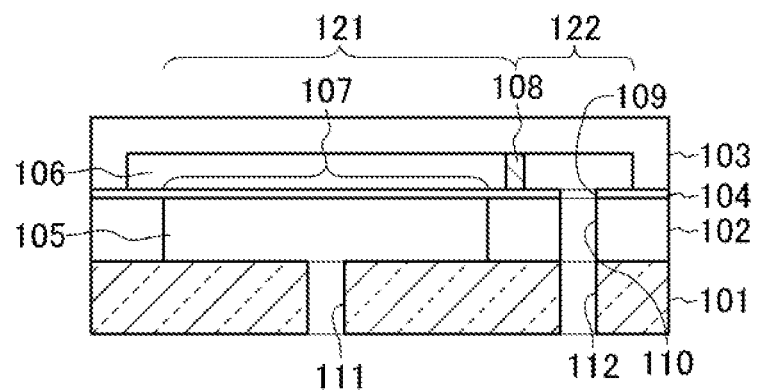
FIG. 1 is a cross-sectional view illustrating a differential pressure gauge configuration according to an embodiment of the present invention.
Figure 2:
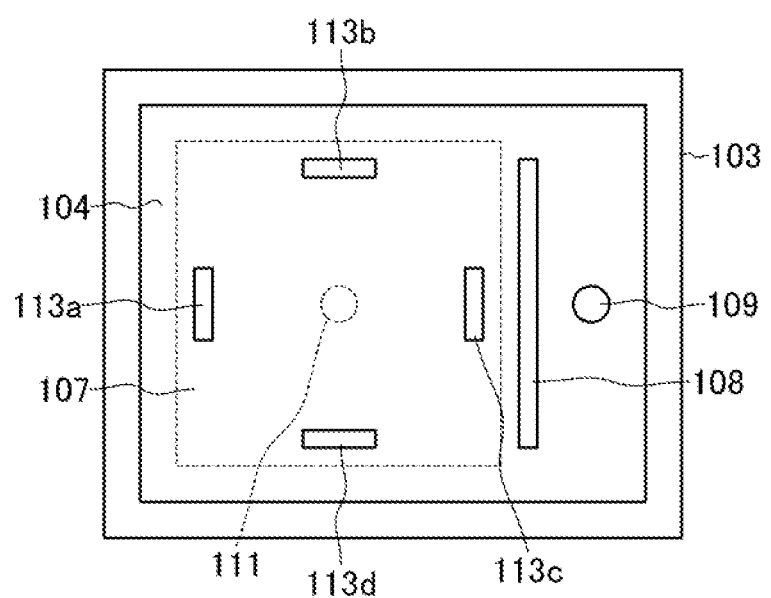
FIG. 2 is a plan view illustrating the differential pressure gauge configuration according to the embodiment of the present invention.

Referring now to FIG. 1 and FIG. 2, a differential pressure gauge of an embodiment of the present invention will be described. The differential pressure gauge comprises a base 101, a first part 102 disposed on an upper surface of the base 101, a second part 103 disposed on the first part 102, and a diaphragm layer 104 disposed between the first part 102 and the second part 103. The first part 102 and the second part 103 are, for example, rectangular in outline. The diaphragm layer 104 is made of a membrane. The base 101 is made of, for example, glass. The first part 102, the second part 103, and the diaphragm layer 104 are made of, for example, Si (silicon). FIG. 2 illustrates a plane below a ceiling facing the diaphragm layer 104 of the second part 103.

The first part 102 defines a first pressure chamber 105, and the second part 103 defines a second pressure chamber 106. The first pressure chamber 105 is formed through the first part 102. The first pressure chamber 105 is, for example, rectangular in plan view. The second pressure chamber 106 has an opening on the diaphragm layer 104 side. The second pressure chamber 106 is, for example, rectangular in plan view. The second pressure chamber 106 comprises a region in which the first pressure chamber 105 is defined and is larger in area than the first pressure chamber 105 in plan view.

The diaphragm layer 104 has a pressure-receiving portion 107 in the region of the first pressure chamber 105 in plan view. The pressure-receiving portion 107 is a part of the region of the diaphragm layer 104 that is defined by the space of the first pressure chamber 105. The pressure-receiving portion 107 can flex (deforming) toward the first pressure chamber 105 and toward the second pressure chamber 106, respectively. The diaphragm layer 104 is formed with a first through-hole 109 having an opening at one end disposed in the second pressure chamber 106 in a region other than the pressure-receiving portion 107. The first part 102 is formed with a second through hole 110 continuing to the first through-hole 109. The base 101 is also formed with a third through-hole 111 having an opening at one end disposed in the first pressure chamber 105, and a fourth through-hole 112 continuing to the second through-hole 110. The third through-hole 111 is disposed in the center portion of the pressure-receiving portion 107 (the center portion of a ceiling surface of the first pressure chamber 105) in plan view.

The first pressure chamber 105 and the third through-hole 111 are filled with a pressure transmitting material, and the second pressure chamber 106, the first through-hole 109, the second through-hole 110, and the fourth through-hole 112 are also filled with the pressure transmitting material. The pressure transmitting material is, for example, silicone oil or fluorine oil.

The differential pressure gauge according to the embodiment has a wall 108 formed inside the second pressure chamber 106. The wall 108 is formed between a first region 121 on a side comprising the pressure-receiving portion 107 and a second region 122 on a side comprising the first through-hole 109, with gaps provided with respect to inner walls of the second pressure chamber 106. The wall 108 serves as a partition between the first region 121 and the second region 122. For example, the wall 108 is formed to be connected to the diaphragm layer 104 and a ceiling of the second pressure chamber 106 facing the diaphragm layer 104. Gaps are formed on both sides of the wall 108 in a planar direction of the diaphragm layer 104, and such gaps connect the first region 121 and the second region 122 on the side of the second pressure chamber 106.

The wall 108 can also be configured to form a gap with respect to the ceiling of the second pressure chamber 106 so that the gap communicates the first region 121 and the second region 122 on the side of the second pressure chamber 106. In this configuration, the wall 108 can also be formed to be connected to each of two side surfaces of the second pressure chamber 106 facing each other across the wall 108. The wall 108 is formed in contact with the diaphragm layer 104.

As an example, a strain gauge 113*a*, a strain gauge 113*b*, a strain gauge 113*c*, and a strain gauge 113*d* are provided in the pressure-receiving portion 107 of the diaphragm layer 104. The strain gauge 113*a*, the strain gauge 113*b*, the strain gauge 113*c*, and the strain gauge 113*d* are used to measure the strain of the pressure-receiving portion 107. Each of the strain gauge 113*a*, the strain gauge 113*b*, the strain gauge 113*c*, and the strain gauge 113*d* may be made of, for example, a plurality of piezoresistive elements.

The strain gauge 113*a*, the strain gauge 113*b*, the strain gauge 113*c*, and the strain gauge 113*d* constitute a bridge circuit. The bridge circuit, when stress is generated in the pressure-receiving portion 107 in a state in which a constant current flows therein or a constant voltage is applied, functions as a differential pressure detection part that outputs a change in resistance value of each piezoresistive element due to the generated stress as a change in voltage. Each node of the bridge circuit is connected to an electrode, not illustrated, via a wiring pattern formed on a face of the region, not illustrated, in the diaphragm layer 104.

According to the above-described embodiment, since the wall 108 is provided between the first region 121 and the second region 122 in the second pressure chamber 106, the difference between an area on which a pressure 1 introduced into the second pressure chamber 106 acts and an area on which a pressure 2 introduced into the first pressure chamber 105 acts can be reduced. Therefore, even when the static pressure is high, the deformation of the diaphragm layer 104 (pressure-receiving portion 107) is suppressed, and the decrease in the S/N ratio can be suppressed. For example, if no wall 108 is provided, the difference between the voltage measured by the strain gauge 113*a* and the voltage measured by the strain gauge 113*c* when static pressure is applied is 29 mV. In contrast, according to the embodiment with the wall 108, the difference between the voltage measured by the strain gauge 113*a* and the voltage measured by the strain gauge 113*c* when the static pressure is applied is reduced to 0.5 mV.

As explained above, according to the present invention, the wall in the second pressure chamber is disposed between the first region on the side comprising the pressure-receiving portion and the second region on the side comprising the first through-hole with the gaps with respect to the inner walls of the second pressure chamber, so that the decrease in the S/N ratio in the differential pressure gauge can be suppressed.

It is apparent that the present invention is not limited to the embodiment described above and that many variations and combinations can be implemented within the technical concept of the invention by persons having ordinary knowledge in the art.

DESCRIPTION OF REFERENCE NUMERALS AND SIGNS

101: base, 102: first part, 103: second part, 104: diaphragm layer, 105: first pressure chamber, 106: second pressure chamber, 107: pressure-receiving portion, 108: wall, 109: first through-hole, 110: second through-hole, 111: third through-hole, 112: fourth through-hole, 113*a* 113*b*, 113*c*, 113*d*: strain gauge, 121: first region, 122: second region

The invention claimed is:

1. A differential pressure gauge comprising:
   a base;
   a first part disposed on an upper surface of the base and defining a first pressure chamber;
   a second part disposed on the first part, comprising a region in which the first pressure chamber is defined in plan view and defining a second pressure chamber, the second pressure chamber being larger than the first pressure chamber;
   a diaphragm layer disposed between the first part and the second part, comprising a pressure-receiving portion in the region of the first pressure chamber in plan view, the diaphragm layer being formed with a first through-hole, the first through-hole having an opening at one end disposed in the second pressure chamber in a region other than the pressure-receiving portion; and a wall disposed between a first region of the second pressure chamber on a side comprising the pressure-receiving portion and a second region on a side comprising the first through-hole, the wall being disposed with gaps formed from inner walls of the second pressure chamber, wherein the first pressure chamber is formed through the first part, the second pressure chamber has an opening on a diaphragm layer side, the first part is formed with a second through hole continuing to the first through-hole, and the base is formed with a third through-hole having an opening at one end disposed in the first pressure chamber, and a fourth through-hole continuing to the second through-hole.

2. The differential pressure gauge according to claim 1, wherein the wall is formed to be connected to the diaphragm layer and a ceiling of the second pressure chamber facing the diaphragm layer.

3. The differential pressure gauge according to claim 1, wherein the wall defines a gap between the diaphragm layer and the ceiling of the second pressure chamber facing the diaphragm layer.

4. The differential pressure gauge according to claim 3, wherein the wall is formed to be connected to each of two side surfaces of the second pressure chamber facing each other across the wall.

5. The differential pressure gauge according to claim 1, further comprising a strain gauge provided in the pressure-receiving portion of the diaphragm layer.

* * * * *